United States Patent
Huang et al.

(10) Patent No.: US 10,855,608 B1
(45) Date of Patent: Dec. 1, 2020

(54) RECONNECT RESTRICTION EVALUATOR

(71) Applicant: Microsoft Technology Licensing, LLC, Redmond, WA (US)

(72) Inventors: Xiaosu Huang, Sunnyvale, CA (US); Ziliang Lin, Menlo Park, CA (US); Jonathan Wei Chen, San Jose, CA (US); Hao Tang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 46 days.

(21) Appl. No.: 15/081,650

(22) Filed: Mar. 25, 2016

(51) Int. Cl.
*H04L 12/801* (2013.01)
*H04L 12/58* (2006.01)

(52) U.S. Cl.
CPC ............. *H04L 47/29* (2013.01); *H04L 51/32* (2013.01)

(58) Field of Classification Search
CPC ................................ H04L 47/29; H04L 51/32
USPC ......................................................... 709/206
See application file for complete search history.

(56) References Cited

U.S. PATENT DOCUMENTS

| | | | | |
|---|---|---|---|---|
| 9,424,612 | B1 * | 8/2016 | Bright | G06Q 50/01 |
| 2008/0201447 | A1 * | 8/2008 | Kim | G06Q 50/00 |
| | | | | 709/218 |
| 2011/0252099 | A1 * | 10/2011 | Pattekar | G06F 17/30371 |
| | | | | 709/206 |
| 2011/0289011 | A1 * | 11/2011 | Hull | G06Q 10/107 |
| | | | | 705/319 |
| 2014/0172989 | A1 * | 6/2014 | Rubinstein | G06Q 50/01 |
| | | | | 709/206 |
| 2017/0139921 | A1 * | 5/2017 | Ball | G06F 16/24578 |

OTHER PUBLICATIONS

Cao et al. "Combating Friend Spam Using Social Rejections". 2015 IEEE 35th International Conference on Distributed Computing Systems (ICDCS). Jun. 29-Jul. 2, 2015. https://doi.org/10.1109/ICDCS.2015.32.*
Cao et al. "Combating Friend Spam Using Social Rejections". 2015 IEEE 35th International Conference on Distributed Computing Systems (ICDCS). Jun. 29-Jul. 2, 2015. https://doi.org/10.1109/ICDCS.2015.32 (Year: 2015).*
Park et al."Social Spam Discovery using Bayesian Network Classifiers based on Feature Extractions", 2013 12th IEEE International Conference on Trust, Security and Privacy in Computing and Communications. Jul. 16-18, 2013. https://doi.org/10.1109/TrustCom.2013.274 (Year: 2013).*

* cited by examiner

*Primary Examiner* — Umar Cheema
*Assistant Examiner* — James Ross Hollister
(74) *Attorney, Agent, or Firm* — Schwegman Lundberg & Woessner, P.A.

(57) ABSTRACT

A reconnect restriction evaluator is described. After detecting that a certain number of the reconnect requests submitted by a member of an on-line social network have failed, the reconnect restriction evaluator performs additional evaluation of the history of reconnect requests stored as associated with a profile of the member and determines whether the high count of failed requests recorded against the member are offset by one or more offsetting factors. Based on the result of the additional evaluation, the reconnect restriction evaluator generates an exemption indicator and stores it as associated with the profile of the member.

14 Claims, 4 Drawing Sheets

RECONNECT RESTRICTION EVALUATOR

TECHNICAL FIELD

This application relates to the technical fields of software and/or hardware technology and, in one example embodiment, to system and method to evaluate reconnect restrictions within an on-line social network system.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system to evaluate reconnect restrictions in an on-line environment is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information about the member's professional skills, such as, e.g., "product management," "patent prosecution," "image processing," etc.). The profile of a member may also include information about the member's current and past employment, such as company identifications, professional titles held by the associated member at the respective companies, as well as the member's dates of employment at those companies.

A member profile is also associated with social links that indicate the associated member's connection to other members of the social network. Any two members of a social network may indicate their mutual willingness to be "connected" in the context of the social network, in that they can view each other's profiles, profile recommendations and endorsements for each other and otherwise be in touch via the social network. Members who are connected in the context of a social network may be termed each other's "connections" and their respective profiles are associated with respective connection links indicative of these two profiles being connected.

In the context of an on-line social network that has its stated or implied purpose to create a professional network of people that have worked together in the past or has some other common educational or professional experience, a connection request, where one member is requesting from another member to form a connection relationship within the on-line social network, may be referred to as a reconnect request. This is due to the notion that in most cases where a legitimate connection request is being made, it is between two members that have had previous professional or interest-based contact. An on-line social network system may be configured to permit most of reconnect requests between members without requiring that the requesting member provides a valid email address for the member, with whom they are trying reconnect.

While the idea of a professional on-line social network is to reconnect former colleagues, classmates, business partners, etc., there are some users that may want to take advantage of this service and send reconnect requests to strangers for undesirable purposes, such as of spam. These less than legitimate reconnect requests are often annoying to members and also such requests are often being rejected or ignored by members who receive a reconnect invitation from another member, with whom the member had no previous contact. An on-line social network system may be configured to address this situation by monitoring reconnect requests, detecting that a certain number of the reconnect requests submitted by a member have been rejected as spam or otherwise failed, and imposing a so-called reconnect restriction on the member's profile. For example, a reconnect restriction imposed on a member profile may entail requiring that the associated member provides, at the time of making a reconnect request with respect to another member, a valid email address of the other member, before the reconnect request is communicated to the other member.

A reconnect request, also referred to as an invitation, can be associated with the following states: pending (meaning that the member who is the subject of the request has not yet responded to the invitation), accepted (meaning that the member who is the subject of the request accepted the invitation and is now a connection of the requesting member), rejected (meaning that the member who is the subject of the request rejected the invitation, which is treated by the on-line social network system as an indication of spam on the part of the requesting member), ignored (indicating that the member who is the subject of the request does not want to reject the request but is reluctant to accept it), and bounced (meaning that the member who is the subject of the request does not exist in the on-line social network system). The "bounced" state can occur when a requesting member, who is a subject of a reconnect restriction that requires that a valid email of another member is provided with a reconnect request, provides an invalid email address of a member, with whom they are trying to connect.

An on-line social network system may include or cooperate with a so-called reconnect restriction evaluator. In one example embodiment, after detecting that a certain number of the reconnect requests submitted by a member have failed (e.g., rejected, ignored, or bounced), the reconnect restriction evaluator performs additional evaluation to determine whether the high count of failed requests recorded against the member are offset by one or more other factors. One such offsetting factor may be a high rate of accepted invitations during a period of time. Another example of an offsetting factor may be a low rate of rejected invitations during a period of time. One or both of these offsetting factors may be used by the reconnect restriction evaluator to determine whether a member should be exempted from a reconnect restriction. For example, if the number of failed reconnect requests submitted by a member is at or above a threshold value that indicates that the member sends out invitations that are spam, but the invitation acceptance rate for that member during a certain predetermined period of time (e.g., the last six month) is at or above 70% and the rejection rate of invitations sent out by the member during that time is lower than 80%, the reconnect restriction evaluator creates an exemption for the member and does not impose a reconnect restriction on that member's profile.

If, however, the reconnect restriction evaluator determines that the high count of failed requests recorded against the member are not offset by a high rate of invitation acceptances and/or by a low rate of failed invitations, the reconnect restriction evaluator imposes a reconnect restriction on that member's profile. One example of manifesting a reconnect restriction to an affected member is as follows. When a member that has a reconnect restriction imposed on their profile initiates a reconnection request in the on-line social network system, the reconnect restriction evaluator generates a user interface comprising a banner informing the member that a valid email address of the subject of the invitation is required in order for the reconnection request to be forwarded to the subject of the invitation. The reconnect restriction evaluator may also generate a presentation comprising a statement regarding the member's high invitation failure rate as an explanation for requesting a valid email address. In those instances where the number of failed reconnect requests submitted by a member is at or above a threshold value that indicates the member being a spammer, but one or more offsetting factors warrant an exemption from a reconnect restriction, the generating of a user interface for presentation to the member comprises omitting the inclusion of such banner. An example reconnect restriction evaluator may be implemented in the context of a network environment 100 illustrated in FIG. 1.

Figure 1:
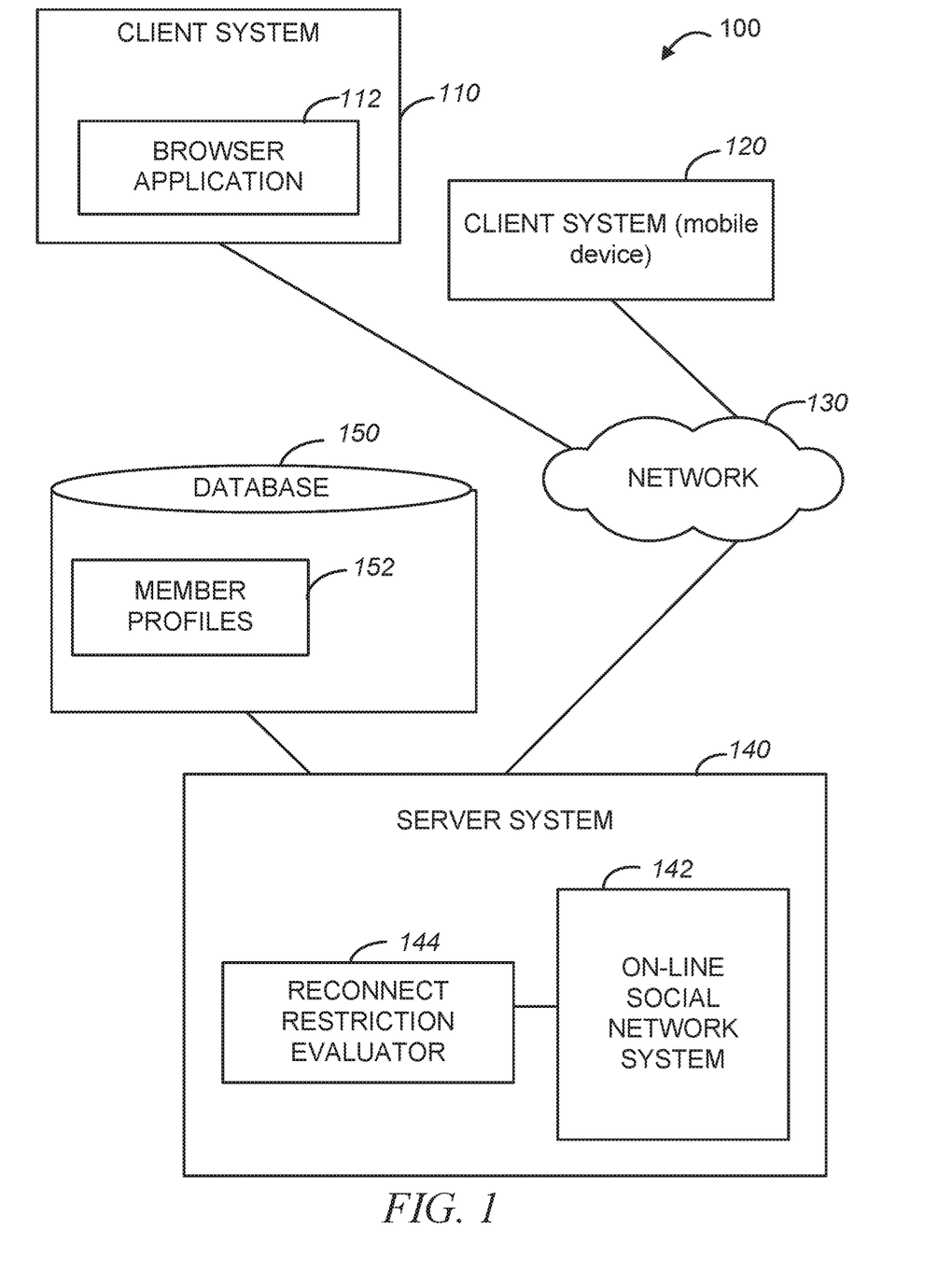
FIG. 1 is a diagrammatic representation of a network environment within which an example method and system to evaluate reconnect restrictions in an on-line environment may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. The database 150 also stores the white list of IP addresses 154. It will be noted that, in some embodiments, the database 150 is considered to be part of the on-line social network system 142.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a reconnect restriction evaluator 144. The reconnect restriction evaluator is configured to have capabilities of a reconnect restriction evaluator described above. It will be noted that, in some embodiments, the reconnect restriction evaluator 144 is considered to be part of the on-line social network system 142. An example reconnect restriction evaluator 144 is illustrated in FIG. 2.

Figure 2:
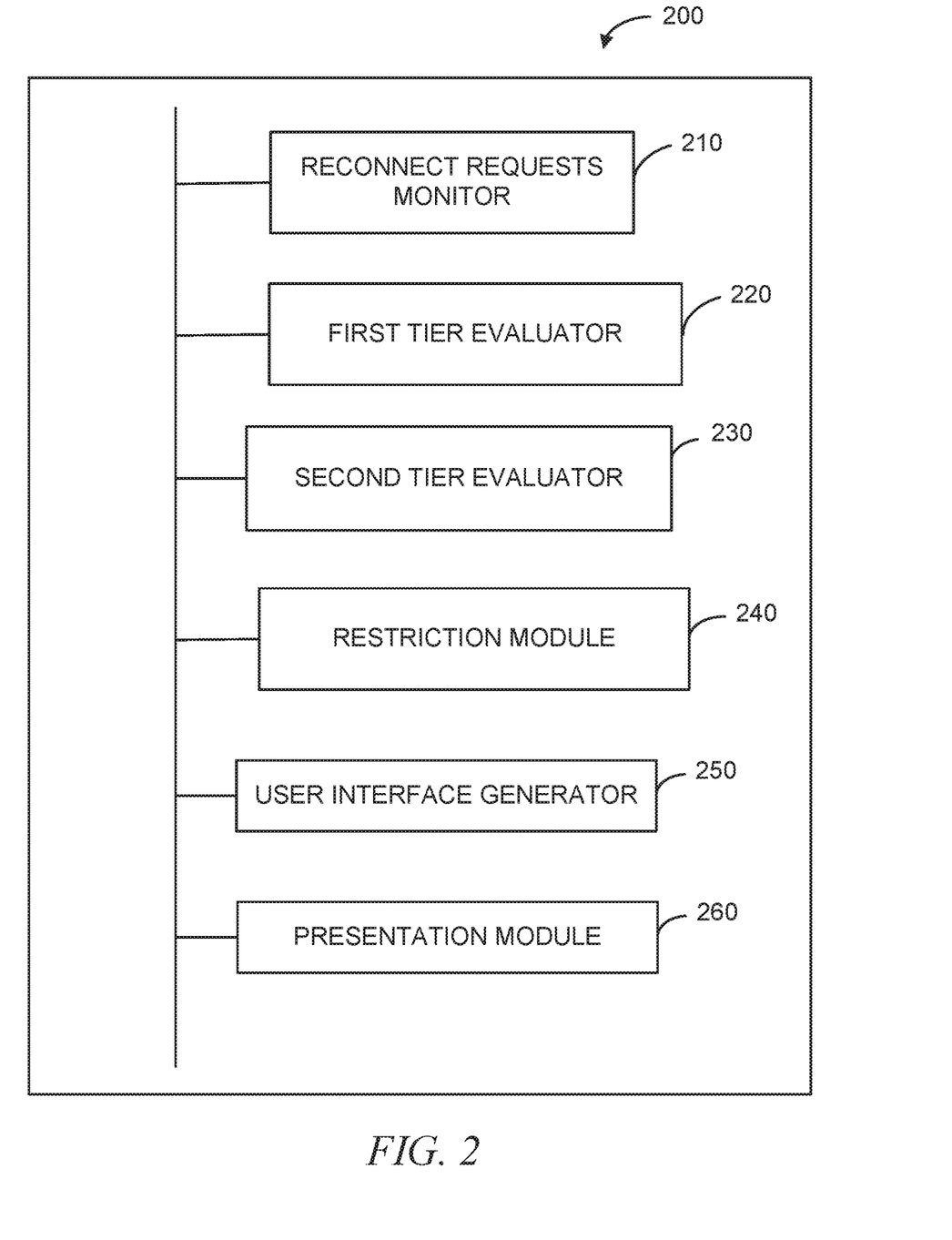
FIG. 2 is block diagram of a system to evaluate reconnect restrictions in an on-line environment, in accordance with one example embodiment.

FIG. 2 is a block diagram of a system 200 to evaluate reconnect restrictions in the on-line social network system 142 of FIG. 1. As shown in FIG. 2, the system 200 includes a reconnect requests monitor 210, a first tier evaluator 220, a second tier evaluator 230, a restriction module 240, a user interface generator 250, and a presentation module 260. The reconnect requests monitor 210 is configured to monitor reconnect requests in the associated on-line social network system (e.g., the on-line social network system 142 of FIG. 1). For example, the reconnect requests monitor 210 detects a reconnect request initiated by a subject member of an on-line social network system with respect to another member of the on-line social network system.

The first tier evaluator 220 is configured to access reconnect requests history associated with a subject profile representing a subject member in the on-line social network system 142. The reconnect requests history associated with a subject profile is stored in a database maintained by or accessible by the associated on-line social network system.

The reconnect requests history includes a count reflecting a number of failed reconnect requests recorded for the subject member in the on-line social network system 142. In one embodiment, a count reflecting a number of failed reconnect requests recorded for the subject member in the on-line social network system 142 is with respect to the entire period of existence of the subject profile. In a further embodiment, a count reflecting a number of failed reconnect requests recorded for the subject member in the on-line social network system 142 is with respect to a predetermined period of time (e.g., with respect to the last 12 months). For the purposes of this description, a failed reconnect request for a member is a reconnect request that was initiated, that is no longer pending and that did not result in a new connection link generated for a profile representing that member in the on-line social network system 142.

The first tier evaluator 220 is configured determine whether the count reflecting a number of failed reconnect requests recorded for the subject member is an indication of spam. In one embodiment, the first tier evaluator 220 determines that the count of failed reconnect requests recorded for a subject member is an indication of spam by comparing the count with a predetermined cutoff value and determining that the count is equal to or greater than a predetermined cutoff value. The first tier evaluator 220 then generates a spam indicator and stores it as associated with a subject profile representing the subject member.

The reconnect requests history associated with a profile of a member also stores a value reflecting a rate of failed reconnect requests initiated by the member during a period of time with respect to accepted reconnect requests initiated by the member during the same period of time. The reconnect requests history also stores a value reflecting a rate of successful reconnect requests initiated by the member during a period of time with respect to failed reconnect requests initiated by the member during the same period of time. A successful reconnect request (also referred to as an accepted reconnect request) is a reconnect request that was initiated, that is no longer pending and that resulted in a new connection link generated for the subject profile. In some embodiments, the reconnect requests history stores a count of accepted reconnect requests and a count of failed reconnect requests, such that a rate of failed reconnect requests and/or a rate of successful reconnect requests can be calculated on-demand by the second tier evaluator 230.

The second tier evaluator 230 is configured to evaluate a rate of failed reconnect requests initiated by the member during a period of time. The second tier evaluator 230 can also be configured to evaluate a rate of accepted reconnect requests initiated by the member during a period of time. In one embodiment, the second tier evaluator 230 performs this second tier evaluation in response to detecting that a member profile representing a member is associated with a spam indicator.

The restriction module 240 is configured to generate an exemption indication and store it as associated with a member profile if a rate of successful reconnect requests associated with the member profile indicates good acceptance rate (e.g., if the acceptance rate is equals to or greater than a good acceptance rate value) and/or a rate of failed reconnect requests associated with the member profile indicates low failure rate (e.g., if the rate of failed reconnect requests is less than a poor acceptance rate value).

The user interface module 250 is configured to generate a user interface in in response to the reconnect request and subsequent to the evaluation performed by the first tier evaluator 220 and, if the member profile associated with the reconnect request is associated with an indication of spam, subsequent to the evaluation performed by the second tier evaluator 230. In response to a reconnect request, the user interface module 250 generates a user interface that includes a restriction manifestation banner if the member profile associated with the reconnect request is associated with an indication of spam and not with an exemption indication. If the member profile associated with the reconnect request is associated with an exemption indication, the user interface module 250 generates a user interface that omits a restriction manifestation banner. A restriction manifestation banner may display information instructing a member to provide a valid email address of the member who is the subject of the reconnect request. The presentation module 260 is configured to cause presentation of the generated user interface on a display device. Some operations performed by the system 200 may be described with reference to FIG. 3.

Figure 3:
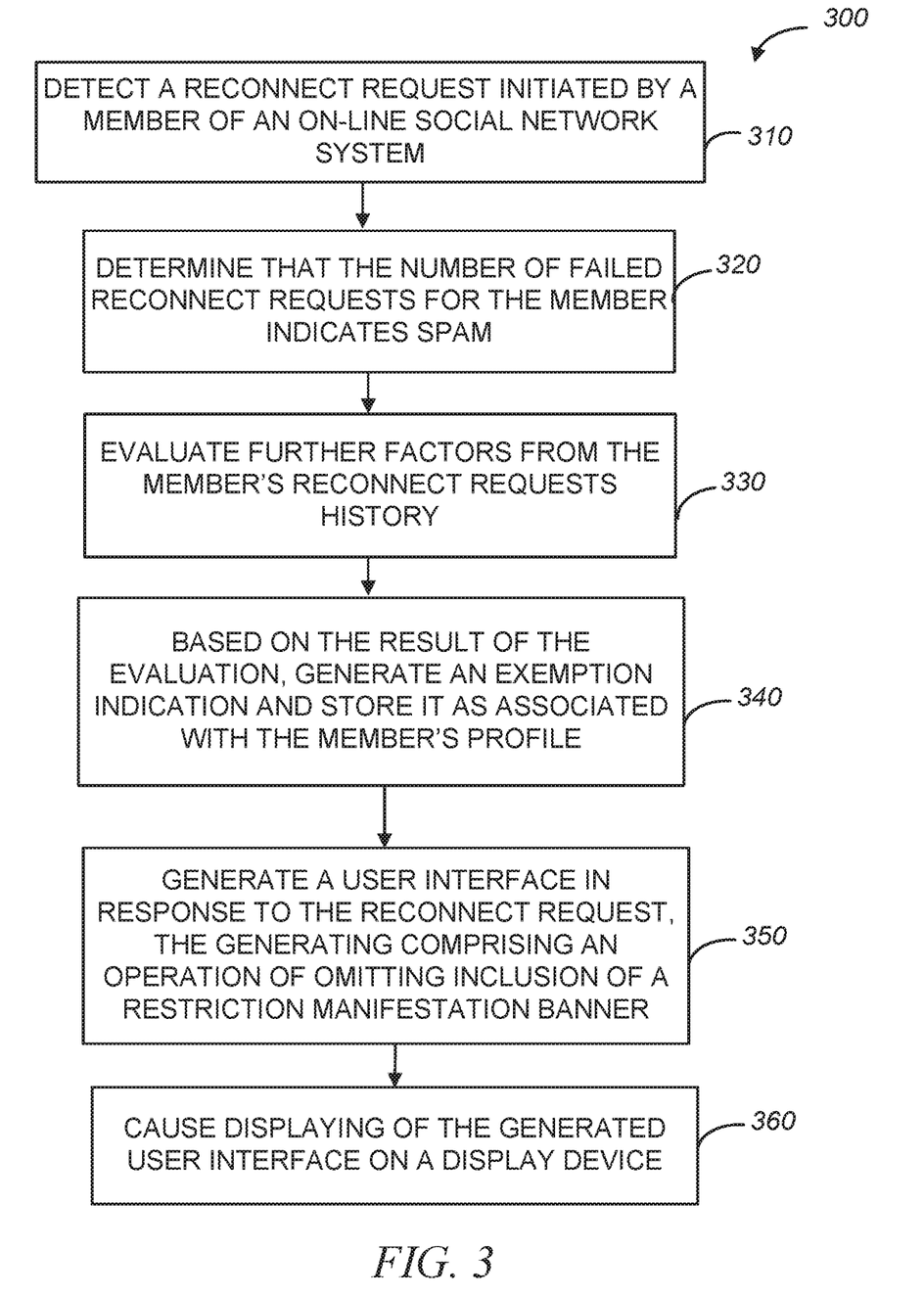
FIG. 3 is a flow chart illustrating a method to evaluate reconnect restrictions in an on-line environment, in accordance with an example embodiment.

FIG. 3 is a flow chart of a method 300 to evaluate reconnect restrictions in an on-line social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the reconnect requests monitor 210 detects a reconnect request initiated by a subject member of an on-line social network system with respect to another member of the on-line social network system. At operation 320, the first tier evaluator 220 determines that a count reflecting a number of failed reconnect requests recorded for the subject member in the on-line social network system 142 and stored in the reconnect requests history associated with a profile representing the subject member indicates spam. The first tier evaluator 220 then generates a spam indicator and stores it as associated with a subject profile representing the subject member. At operation 330, the second tier evaluator 230 evaluates additional factors from the reconnect requests history, such as a rate of failed reconnect requests initiated by the member during a period of time and/or a rate of accepted reconnect requests initiated by the member during the same period of time. At operation 340, the restriction module 240 generates an exemption indication based on the results of the evaluation by the second tier evaluator 230 and stores it as associated with the member profile.

At operation 350, the user interface module 250 generates a user interface in in response to the reconnect request and subsequent to the evaluation performed by the first tier evaluator 220 and, if the member profile associated with the reconnect request is associated with an indication of spam, subsequent to the evaluation performed by the second tier evaluator 230. In response to a reconnect request, the user interface module 250 generates a user interface omitting the inclusion of a restriction manifestation banner in the user interface. At operation 360, the presentation module 260 causes presentation of the generated user interface on a display device.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
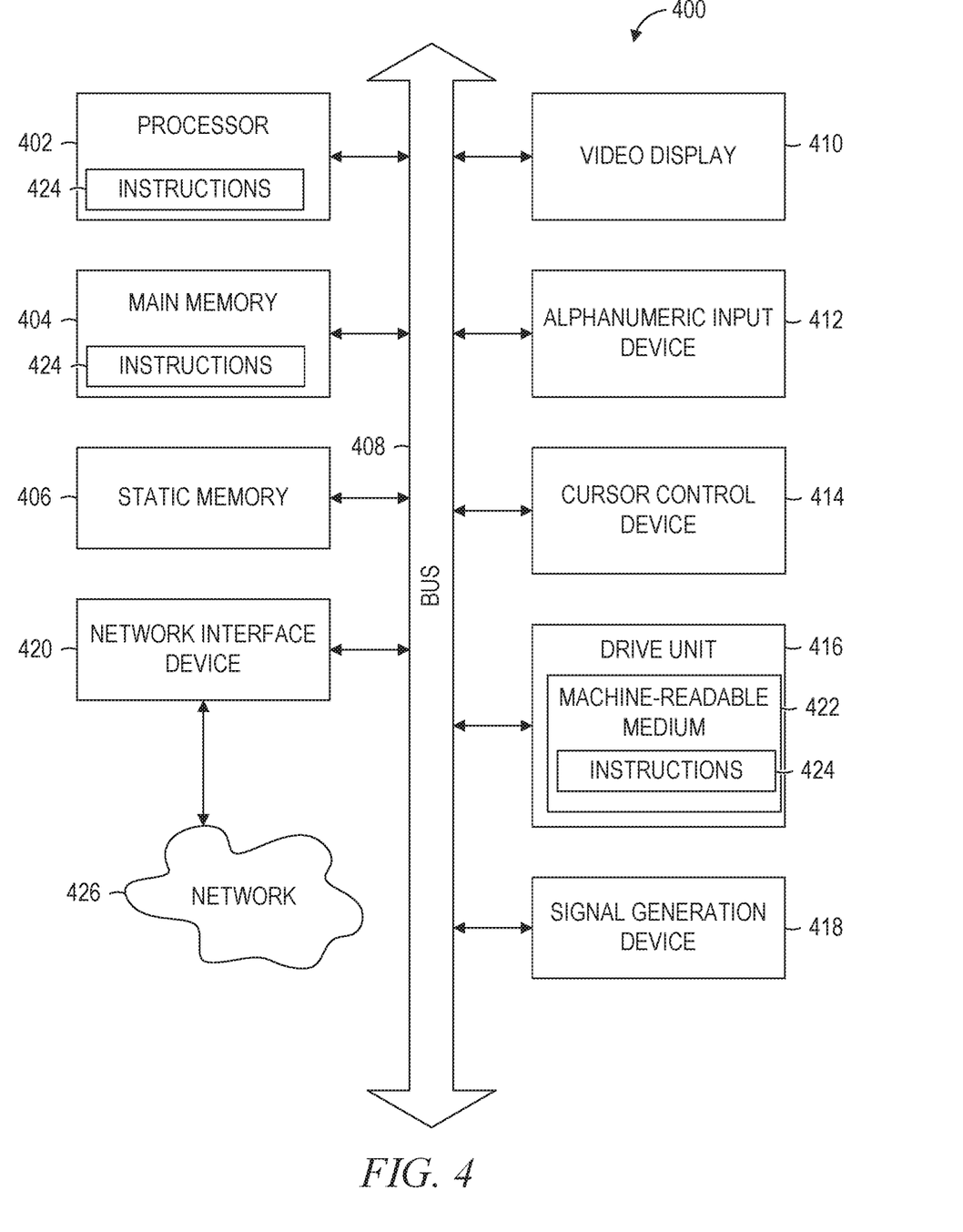
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to evaluate reconnect restrictions in an on-line environment has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A method comprising:
generating an indication of spam based on a first count reflecting a number of failed reconnect requests recorded for a subject member represented by a subject profile in an on-line social network system, a failed reconnect request for the subject member is a reconnect request that was initiated in the on-line network system, that is no longer pending and that did not result in a new connection link generated for the subject profile;
storing the indication of spam as associated with the subject profile;
detecting a first subsequent reconnect request originated from the subject member;
based on the indication of spam stored as associated with the subject profile, causing presentation of a user interface that includes a restriction manifestation banner on a display device of the subject member in response to the first subsequent reconnect request initiated from the subject profile and preventing communication of the reconnect reguest to an intended recipient;
detecting a further subsequent reconnect request originated from the subject member in the on-line network system;
responsive to the further subsequent reconnect request and the indication of spam, determining, with respect to the subject member profile, offsetting factors warrant an exemption from a reconnect restriction, the offsetting factors including a rate of failed reconnect requests initiated by the subject member during a period of time being less than a poor acceptance threshold and a rate of accepted reconnected requests initiated by the subject member during the period of time being greater than a good acceptance threshold value; and
based on only the offsetting factors that warrant an exemption from a reconnect restriction, and in response to the further subsequent reconnect request detected in the on-line network system subsequent to the storing of the exemption indication as associated with the subject profile, causing presentation of the user interface that lacks the restriction manifestation banner on a display device of the subject member and communicating the reconnect reguest to the intended recipient.

2. The method of claim 1, comprising determining that the first count is an indication of spam based on the first count being equal to or greater than a cutoff value.

3. The method of claim 1, comprising causing presentation of the generated user interface on a display device.

4. The method of claim 1, wherein the restriction manifestation banner is actionable to obtain from the subject member further information associated with the first subsequent reconnect request.

5. The method of claim 1, wherein the first count reflects a number of overall failed reconnect requests recorded for the subject member in the on-line social network system.

6. The method of claim 1, wherein the first count reflects a number of failed reconnect requests recorded for the subject member in the on-line social network system during a period of time.

7. The method of claim 1, wherein the on-line social network system is a professional on-line social network system.

8. A computer-implemented system comprising:
one or more processors; and a non-transitory computer readable storage medium comprising instructions that when executed by the one or processors cause the one or more processors to perform operations comprising:
generating an indication of spam based on a first count reflecting a number of failed reconnect requests recorded for a subject member represented by a subject profile in an on-line social network system, a failed reconnect request for the subject member is a reconnect request that was initiated in the on-line network system, that is no longer pending and that did not result in a new connection link generated for the subject profile;
storing the indication of spam as associated with the subject profile;
detecting a first subsequent reconnect request originated from the subject member;
based on the indication of spam stored as associated with the subject profile, causing presentation of a user interface that includes a restriction manifestation banner on a display device of the subject member in response to the first subsequent reconnect request initiated from the subject profile and preventing communication of the reconnect request to an intended recipient;
detecting a further subsequent reconnect request originated from the subject member in the on-line network system;
responsive to the further subsequent reconnect request and the indication of spam, determining, with respect to the subject member profile, offsetting factors that warrant an exemption from a reconnect restriction, the offsetting factors including a rate of failed reconnect requests initiated by the subject member during a period of time being less than a poor acceptance threshold and a rate of accepted reconnected requests initiated by the subject member during the period of time being greater than a good acceptance threshold value;
based on only the offsetting factors that warrant an exemption from a reconnect restriction, and in response to the further subsequent reconnect request detected in the on-line network system subsequent to the storing of the exemption indication as associated with the subject profile, causing presentation of the user interface that lacks the restriction manifestation banner on a display device of the subject member and communicating the reconnect request to the intended recipient.

9. The system of claim 8, comprising determining that the first count is an indication of spam based on the first count being equal to or greater than a cutoff value.

10. The system of claim 8, comprising causing presentation of the generated user interface on a display device.

11. The system of claim 8, wherein the restriction manifestation banner is actionable to obtain from the subject member further information associated with the first subsequent reconnect request.

12. The system of claim 8, wherein the first count reflects a number of overall failed reconnect requests recorded for the subject member in the on-line social network system.

13. The system of claim 8, wherein the first count reflects a number of failed reconnect requests recorded for the subject member in the on-line social network system during a period of time.

14. A machine-readable non-transitory storage medium having instruction data executable by a machine to cause the machine to perform operations comprising:
generating an indication of spam based on a first count reflecting a number of failed reconnect requests recorded for a subject member represented by a subject profile in an on-line social network system, a failed reconnect request for the subject member is a reconnect request that was initiated in the on-line network system, that is no longer pending and that did not result in a new connection link generated for the subject profile;
storing the indication of spam as associated with the subject profile;
detecting a first subsequent reconnect request originated from the subject member;
based on the indication of spam stored as associated with the subject profile, causing presentation of a user interface that includes a restriction manifestation banner on a display device of the subject member in response to the first subsequent reconnect request initiated from the subject profile and preventing communication of the reconnect request to an intended recipient;
detecting a further subsequent reconnect request originated from the subject member in the on-line network system;
responsive to the further subsequent reconnect request and the indication of spam,
determining, with respect to the subject member profile, offsetting factors that warrant an exemption from a reconnect restriction, the offsetting factors including a rate of failed reconnect requests initiated by the subject member during a period of time being less than a poor acceptance threshold and a rate of accepted reconnected requests initiated by the subject member during the period of time being greater than a good acceptance threshold value;
based on only the offsetting factors that warrant an exemption from a reconnect restriction, and in response to the further subsequent reconnect request detected in the on-line network system subsequent to the storing of the exemption indication as associated with the subject profile, causing presentation of the user interface that lacks the restriction manifestation banner on a display device of the subject member and communicating the reconnect request to the intended recipient.

* * * * *

UNITED STATES PATENT AND TRADEMARK OFFICE
CERTIFICATE OF CORRECTION

PATENT NO. : 10,855,608 B1
APPLICATION NO. : 15/081650
DATED : December 1, 2020
INVENTOR(S) : Huang et al.

Page 1 of 1

It is certified that error appears in the above-identified patent and that said Letters Patent is hereby corrected as shown below:

In the Claims

Column 10, Line 22, Claim 1, delete "reguest" and insert --request-- therefor

Column 10, Line 45, Claim 1, delete "reguest" and insert --request-- therefor

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*